United States Patent [19]
Morgan

[11] Patent Number: 4,765,262
[45] Date of Patent: Aug. 23, 1988

[54] THREE DISK OPENER ASSEMBLY

[76] Inventor: Frank W. Morgan, 1300 Mt. Ellis La., Bozeman, Mont. 59715

[21] Appl. No.: 22,791

[22] Filed: Mar. 6, 1987

[51] Int. Cl.⁴ .............................................. A01C 5/08
[52] U.S. Cl. ...................................... 111/73; 111/85; 111/88; 172/185
[58] Field of Search ...................... 111/73, 80, 85, 87, 111/88; 172/184, 185, 187, 538

[56] References Cited

U.S. PATENT DOCUMENTS

| | | | |
|---|---|---|---|
| 618,110 | 1/1899 | Lundy | 111/88 |
| 620,370 | 2/1899 | Schultz | 111/88 |
| 709,637 | 9/1902 | Hoyt et al. | 111/88 |
| 799,022 | 9/1905 | Tunnicliff | 111/88 X |
| 1,747,525 | 2/1930 | Nagy | 111/87 |
| 2,192,947 | 3/1940 | White | 111/88 |
| 4,408,551 | 10/1983 | Keller et al. | 111/87 |
| 4,550,122 | 10/1985 | David et al. | 111/88 X |

FOREIGN PATENT DOCUMENTS

| | | | |
|---|---|---|---|
| 2060340 | 5/1981 | United Kingdom | 111/88 |
| 843814 | 7/1981 | U.S.S.R. | 111/80 |

Primary Examiner—James R. Feyrer
Attorney, Agent, or Firm—Richard C. Conover

[57] ABSTRACT

An agricultural planter in which three coulters are mounted on a single shaft, which shaft is supported at each end with side supports carried by the frame of the planter. A main large diameter coulter is used to break the soil to make a furrow, another coulter of smaller diameter is used to place fertilizer in one band and yet another coulter of yet smaller diameter is used to plant seed in another band with all three coulters being mounted on a single shaft. The structure described herein makes it possible to mount all three coulters on a single shaft, and yet permit each coulter to rotate independently of one another while operating as a unit.

6 Claims, 3 Drawing Sheets

THREE DISK OPENER ASSEMBLY

BACKGROUND OF INVENTION

The present invention relates to a furrow opener and agricultural seed planter, and more particular to a minimum tillage type planter.

In certain types of agriculture, and in particular the growing of wheat and barley and other cereal grains, minimum tillage methods of agriculture commonly called "no-till" tillage has been used to reduce moisture evaporation losses over conventional plowing type tillage. The advantages of "no-till" tillage include conservation of fuel costs and labor for the reason that less working of the soil is required. Further, since the ground is broken only minimally, there is little wind and water erosion which would otherwise occur with normal plowing type tillage. Other advantages of minimum type tillage are described in U.S. Pat. No. 4,550,122.

Many "no-till" methods and apparatus are known in the art, such as U.S. Pat. No. 4,550,122 which relates to an attachment for removing residue in front of a planter. See also British Pat. No. 1,150,723 which describes a coulter device for seed drills, and U.S. Pat. No. 4,624,196 which describes a combined seed drill and fertilizer applicator, together with U.S. Pat. No. 4,090,456 which describes a furrow opener and apparatus for no-tillage transplanters and planters.

The known "no-till" planters utilize two coulters mounted on two separate axles to open a furrow for planting seed such as shown in U.S. Pat. No. 4,430,952 to Murray. See also U.S. Pat. No. 4,090,456 to Morrison Jr. which shows two coulters mounted on two separate axles which open a furrow for planting.

It has been found that when fertilizer is drilled into the ground at the same time seed is drilled, only a small amount of fertilizer can be placed in the same furrow as the seed because otherwise germination of the seed would be damaged. Therefore it has been found that fertilizer should be placed in a separate furrow in the ground at a distance from the seed, preferably slightly below or to one side of the seed furrow when the planting is being done. This process is known as banding fertilizer. In the known apparatus, the banding is done with a separate coulter which is positioned to make a furrow to one side of the seed furrow or positioned to make a furrow at a deeper level than the seed furrow. The former type of apparatus is shown in U.S. Pat. No. 4,624,196 to Anderson.

With conventional seed and fertilizer apparatus used for "no-till" agriculture, the seed coulter and fertilizer coulter trail one another, as is shown in U.S. Pat. No. 4,624,196 to Anderson.

Because the present known "no-till" apparatus includes coulters that are trailing other coulters, the longitudinal extent of the planter apparatus is greater than would be the case if the coulters were not trailing one another. This increased length creates problems when the tractor is pulling these coulters over hills and also when the tractor draws the planter in a curved path such a when the planter is being turned.

With the present invention, many of the disadvantages of the known "no-till" planters are eliminated.

SUMMARY OF THE INVENTION

The present invention relates to a planter in which three coulters are mounted on a single shaft, which shaft is supported at each end with side supports carried by the frame of the planter being drawn by a tractor or other mechanized device. With the present invention a main large diameter coulter is used to break the soil to make a furrow, another coulter of smaller diameter is used to place fertilizer in one band and yet another coulter of yet smaller diameter is used to plant seed in another band with all three coulters being mounted on a single shaft. Thus with the present invention, the seed and fertilizer are placed at different levels in the ground.

The fertilizer coulter and seed coulter are positioned on the same shaft so that they do not trail one another. Hence the longitudinal extent of the planter is minimized and the planter can generally be better used on hills or in making turns than conventional drill type planters.

BRIEF DESCRIPTION OF THE DRAWINGS

In order that the invention may be clearly understood and readily carried into effect, a preferred embodiment will now be described by way of example only, with reference to the accompanying drawings wherein.

DESCRIPTION OF A PREFERRED EMBODIMENT

Figure 1:
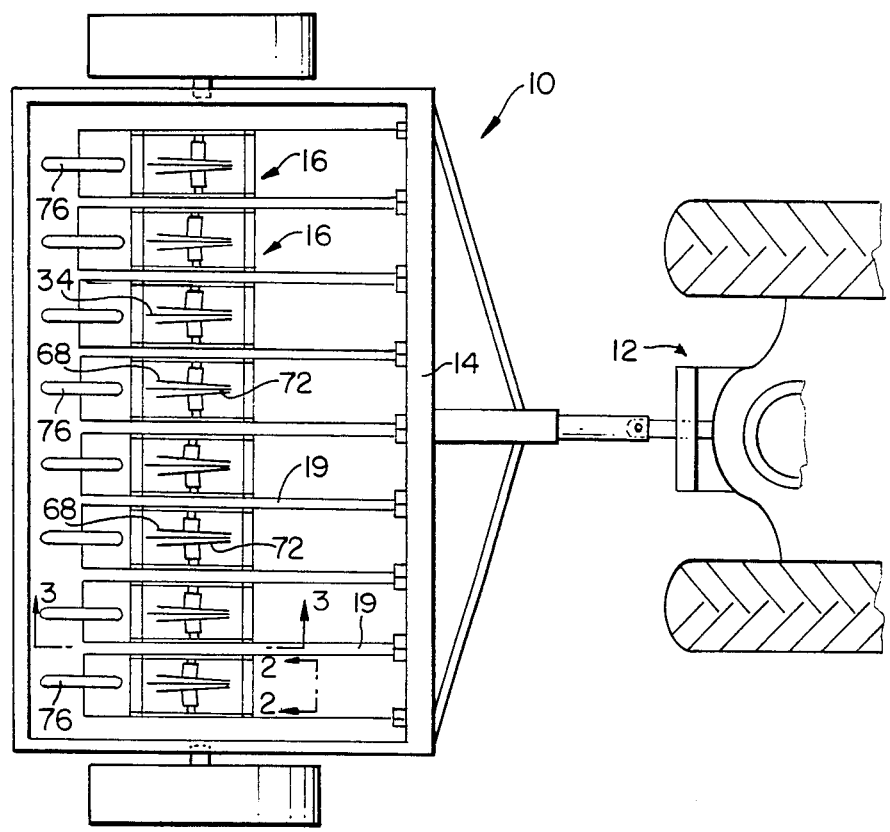
FIG. 1 shows a top plan view of a planter according to the present invention attached to a tractor.
Figure 2:
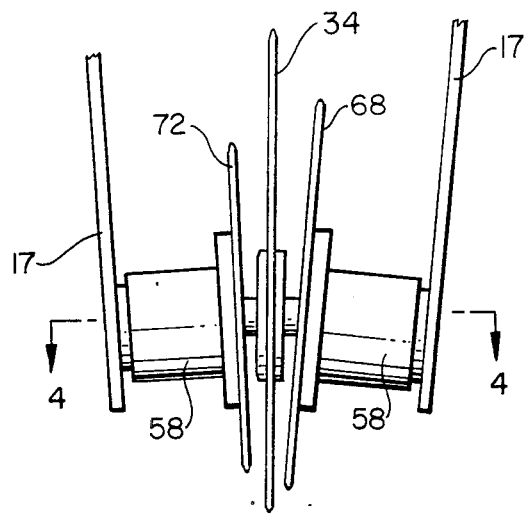
FIG. 2 is a partial elevational front view of the present invention taken along line 2—2 in FIG. 1.

In the drawings, and in particular FIG. 1, a planter 10 is shown which is attached to a tractor 12 for the purpose of drawing the planter 10 through a field for planting seeds and inserting fertilizer in the soil to be planted. It is contemplated that multiple planter units 16 may be attached to a frame 19 attached to a draw bar 14 for planting seeds and banding fertilizer in the soil to be planted. A single planter unit is shown in FIGS. 2, 3 and 4 and is illustrative of the planters 16 contemplated by the present invention.

Figure 3:
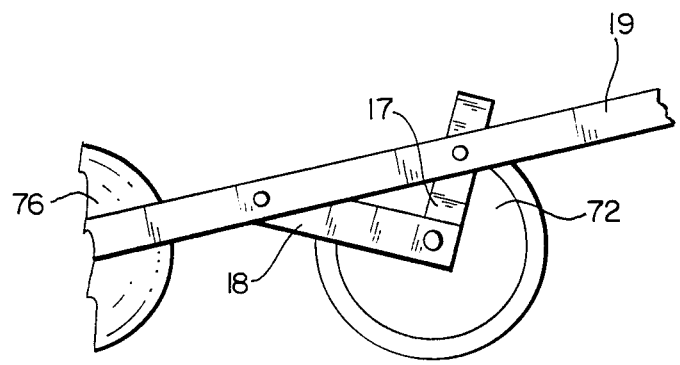
FIG. 3 is a partial elevational side view taken along line 3—3 of FIG. 1.

As shown in FIG. 3, main shaft support members 17 and 18 are secured to the frame 19 as by bolting one end of each. The free end of member 17 is positioned to abut the member 18 to form a triangle as shown in FIG. 3. The member 17 is then welded to member 18. The end of member 18 distal from the frame 19 includes a transverse bore 26 formed therein which bore carries a thrust bearing 22 as shown in FIG. 4. The planter unit 16 has opposing pairs of support members 17 and 18 as shown in FIGS. 2 and 4 and the bore 26 in each pair is coaxially aligned.

A cylindrical spindle 28 is mounted in orthoganal relation to the longitudinal axes of the side support members 17 and 18 in cantilever fashion. Each of the spindles 2 extend in a direction toward the other pair of side support members 17 and 18. The spindles include a horizontal bore 30 as shown in FIG. 4 which extends through the spindle and communicates with the bores 26 in side supports 17 and 18. The spindle 28 is positioned with its longitudinal axis at a slight upward and rearward angle with respect to the axis of bore 30 as shown in FIG. 4, thus the bore 30 is not formed along the longitudinal axis of spindle 28.

Figure 4:
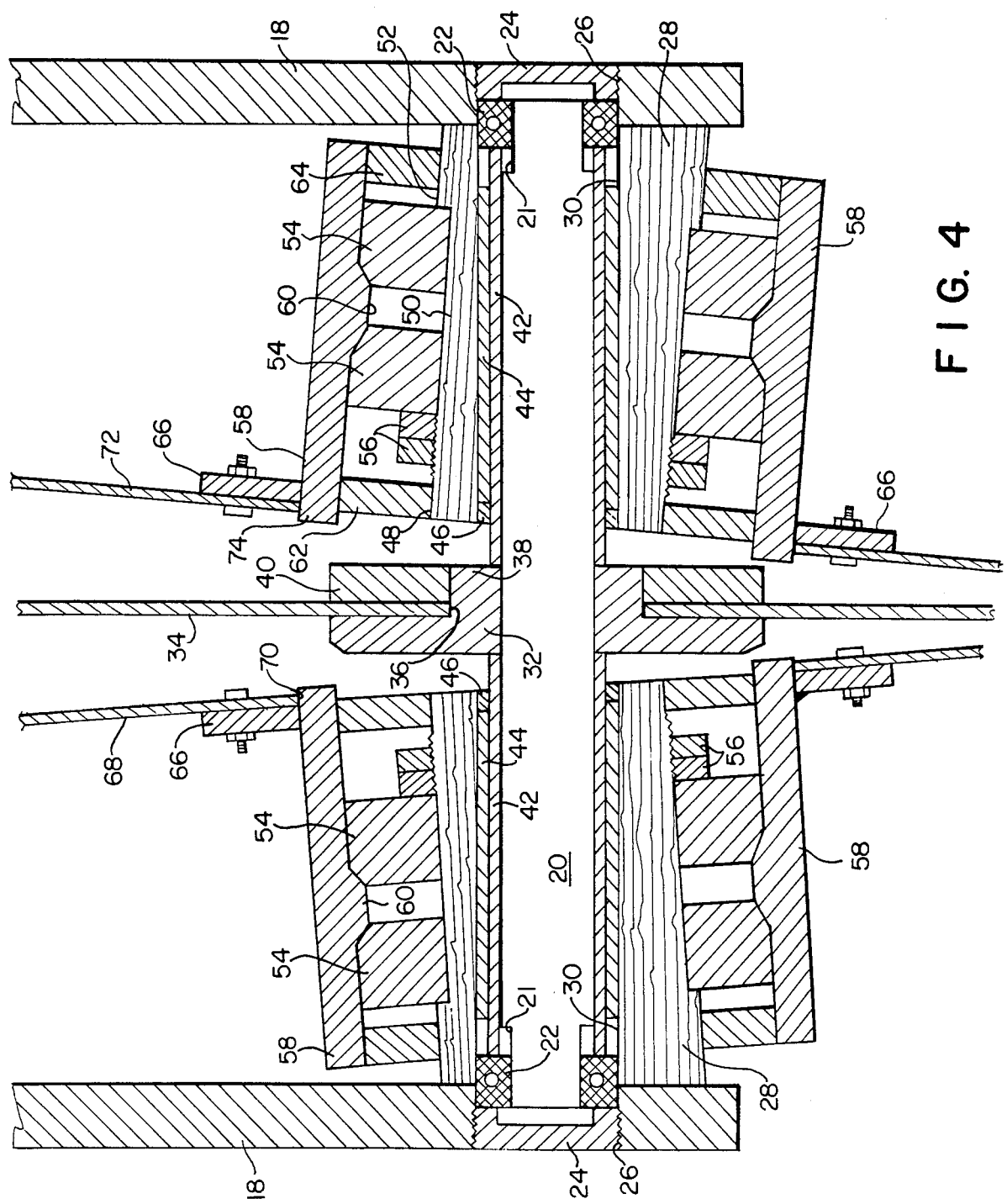
FIG. 4 is a sectional view of the coulter apparatus taken along line 4—4 in FIG. 2.

A main shaft 20 is positioned to extend through the bore 30 as shown in FIG. 4. The ends of main shaft 20 are machined having a stepped end 21 of smaller diameter which ends are journalled within thrust bearings 22 at each end of shaft 20 as shown in FIG. 4. The bores 26 have threads at the outer portion thereof for receiving thrust bearing adjustment nuts 24 to secure the thrust bearings 22 in place. Thus the main shaft 20 is supported at both ends thereof by opposing pairs of main shaft supports 17 and 18.

A main coulter hub 32 is heat fitted to the main shaft 20 at a central location thereof between the two pairs of side supports 17 and 18. A main coulter 34 having a central bore 36 is mounted on a concentric flange 38 defined by main coulter hub 32 and is secured thereto with a collet 40 riveted to the main coulter hub 32, sandwiching the main coulter 34 in between.

On each side of the main coulter hub 32 and secured to the main shaft 20 is a bearing sleeve 42 which sleeve 42 has one end abutting main coulter hub 32 and the other end abutting the thrust bearing 22 as shown in FIG. 4. This sleeve 42 serves the purpose of transmitting lateral forces on the main coulter 34 to the thrust bearings 22.

An elongated bearing or bushing 44 is press fitted in bore 30 of the spindle 28 in surrounding relation to the sleeve 42. A ring seal 46 is located at the inner end of each bearing or bushing 44.

The bore 30 in spindle 28 is a straight bore of constant diameter. The outer surface of cylindrically shaped spindle 28 is shaped to have a first inner step 48, an adjacent intermediate step 50 and an outer step 52. The steps 48, 50 and 52 are sized s that the cylindrically shaped spindle 28 increases in diameter in a step-wise manner from the inner step 48 to the outer step 52.

Ring bearings 54 and 54a are positioned on intermediate step 50 located adjacent the outer step 52. The bearings 54 and 54a support a hub 58 which hub has an interiorly extending stop portion 60 separating the two bearings 54. The outer bearing 54 is thus held in position by the stop 60 and the outer step 52. The inner bearing is secured in position by stop 60 and a pair of lock nuts 56 threaded on a threaded portion of spindle 28. An inner oil seal 62 is positioned on the inner step 48 between the inner step 48 and the hub 58. An outer seal 64 is positioned on the outer step 52 and extends between the outer step 52 and the hub 58.

Each of the hubs 58 on each side of the main coulter 34 has an outwardly extending flange 66. A seed coulter 68 having an axial bore 70 is mounted on the hub 58 as by riveting or bolting the seed coulter 68 to the flange 66. The seed coulter 68 is sized to have a diameter smaller than the main coulter 34.

On the other side of the main coulter 34, that is the right hand side as shown in FIG. 4, a fertilizer coulter 72 having an axial bore 74 is mounted to the hub 58 as by riveting or bolting to the corresponding flange 66. The diameter of the fertilizer coulter 72 is selected to be intermediate the diameter of the seed coulter 68 and the main coulter 34. Since the hub 58 has been mounted on a cylindrically shaped spindle 28, which spindle has been secured to the side supports 17 and 18 in a slightly upwardly and rearwardly direction, the seed coulter 68 and the fertilizer coulter 72 are tilted with respect to the main coulter 34 mounted on shaft 20 as shown in FIG. 4. The right hand side spindle 28, as shown in FIG. 4, and the left hand side spindle 28, as shown in FIG. 4, are each selectively positioned in relation to the size of the seed coulter 68 and the fertilizer coulter 72 so that the lower edge of the respective coulters is positioned adjacent the vertical main coulter 34, as shown in FIG. 2 at a position where the respective coulter pierce the ground surface.

Conventional apparatus (not shown) is used for dropping seed between the seed coulter 68 and the main coulter 34, and for dropping fertilizer between the main coulter 34 and the fertilizer coulter 72, as is well known in the art.

With this arrangement of these coulters, it can readily be determined that the main coulter 34 performs at least four functions: (1) cuts away residue; (2) opens the soil for seed and fertilizer; (3) absorbs the shock of contact with rocks; and (4) takes most of the wear while protecting the two side coulters.

The seed coulter 68 opens a furrow for seed to be planted at one level beneath the surface of the ground. The fertilizer coulter 72 opens a second furrow formed by the main coulter 34 on the other side of the main coulter 34 and positions fertilizer at a level below the level at which the seed is being planted. With this arrangement, banding of the fertilizer is accomplished at a level below and slightly to one side of the furrow where the seed is being planted.

The unique structure described herein makes it possible to mount all three coulters on a single shaft and yet permit each coulter to rotate independently of one another while operating as a unit.

After placement of the seed and fertilizer, the seed furrow and the fertilizer furrow are filled in by a trailing packer wheel 76 as is shown in FIG. 3 and as is well known in the art.

By combining the seed coulter 68 and the fertilizer coulter 72 on the same shaft as the main coulter 34, this eliminates a source of difficulty with coulters mounted on separate axles. When coulters are mounted on separate axles, it is conventional to mount them in cantilever fashion. Thus the axles may break, since they are not supported at both ends thereof. Here the main shaft 20 is supported at each end by the side support pairs 17 and 18. This provides a much stronger supporting axle for all three coulters than has been previously known.

Further, combining the seed coulter 68 and the fertilizer coulter 72 on a single shaft makes possible that the planter unit 16 can be constructed to be of much smaller length than conventional planters, making it easier for this planter to be used on hills and when making turns.

While the fundamental novel features of the invention have been shown and described, it should be understood that various substitutions, modifications and variations may be made by those skilled in the art without departing from the scope of the invention. Accordingly, all such modifications and variations are included in the scope of the invention as defined by the following claims.

I claim:

1. A coulter device to be drawn across a ground surface in a direction of travel for penetrating the ground surface, which coulter device is connected to a frame positioned above the ground surface comprising:
   (a) a pair of opposing and spaced apart support members secured in depending relation to the frame;
   (b) a first and second spindle, each mounted at one end thereof to a support member with the other end thereof extending in a general direction toward the other support member and each spindle having an axis;
   (c) a main shaft having an axis and located in a generally horizontal position and carried within a straight bore formed through the pair of support members and the pair of spindles;

(d) a main coulter hub secured to the main shaft at a position intermediate the ends thereof, the hub having a flange formed thereon coaxial with the axis of the main shaft for carrying a first coulter;

(e) a hub mounted to each spindle in coaxial relation with the spindle, each spindle hub being mounted by means allowing free rotation around the axis of the spindle;

(f) a second coulter secured to the hub of the first spindle;

(g) a third coulter secured to the hub of the second spindle;

(h) the first spindle further being mounted to a support member with the axis of the first spindle tilted with respect to the axis of the main shaft whereby the second coulter is tilted with respect to the first coulter with a portion of the outer edge of the second coulter abutting or in close proximity to the side surface of the first coulter, this point of abutment or close proximity being forward, in the direction of travel, of the vertical through the axis of rotation of the first coulter;

(i) the second spindle further being mounted to the other support member with the axis of the second spindle tilted with respect to the axis of the main shaft whereby the third coulter is tilted with respect to the first coulter with a portion of the outer edge of the third coulter abutting or in close proximity to the side surface of the first coulter, this point of abutment or close proximity being forward, in the direction of travel, of the vertical through the axis of rotation of the first coulter.

2. The coulter device according to claim 1 wherein the point of abutment or close proximity of the second coulter with the first coulter is positioned where the second coulter penetrates the ground surface and the point of abutment or close proximity of the third coulter with the first coulter is positioned where the third coulter penetrates the ground surface.

3. The coulter device according to claim 1 wherein the ends of the main shaft are supported at each end by a pair of thrust bearings, each thrust bearing being fitted within the corresponding bore extending through the opposing pair of support members.

4. The coulter device according to claim 3 further including a cylindrical sleeve surrounding the main shaft and abutting the main coulter hub at one end, and at the other end abutting the thrust bearing mounted in the corresponding side support, whereby lateral forces on the main coulter hub are transmitted directly to the thrust bearings.

5. A coulter device according to claim 1 wherein the first, second and third coulters have different diameters.

6. A coulter device according to claim 5 wherein the first coulter has a diameter larger than the second and third coulters.

* * * * *